(12) United States Patent
van Steenbergen et al.

(10) Patent No.: US 8,626,933 B2
(45) Date of Patent: Jan. 7, 2014

(54) OPTIMIZING BUDDY FINDER TELECOMMUNICATION SERVICE

(75) Inventors: Ate Sander van Steenbergen, Groningen (NL); Onno ter Wisscha, Utrecht (NL); René van den Beemt, Rotterdam (NL)

(73) Assignee: Koninklijke KPN N.V., The Hague (NL)

( * ) Notice: Subject to any disclaimer, the term of this patent is extended or adjusted under 35 U.S.C. 154(b) by 324 days.

(21) Appl. No.: 12/954,812

(22) Filed: Nov. 26, 2010

(65) Prior Publication Data

US 2011/0131311 A1 Jun. 2, 2011

(30) Foreign Application Priority Data

Nov. 27, 2009 (EP) .................................... 09177302

(51) Int. Cl.
*G06F 15/173* (2006.01)
*G06F 15/16* (2006.01)

(52) U.S. Cl.
USPC ............................ 709/228; 709/207; 709/224

(58) Field of Classification Search
USPC .................. 709/223, 206–207, 224, 227–228
See application file for complete search history.

(56) References Cited

U.S. PATENT DOCUMENTS

| 6,968,179 | B1 * | 11/2005 | De Vries .................... 455/414.1 |
| 2002/0183052 | A1 | 12/2002 | Tachikawa | |
| 2011/0102267 | A1 * | 5/2011 | Janiszewski et al. ......... 342/463 |

FOREIGN PATENT DOCUMENTS

| EP | 1691565 | 8/2006 |
| JP | 2003153522 | 5/2003 |

OTHER PUBLICATIONS

A Permutation-Based Approch to Estimating Monotone Index, by Debopam et al. Jan. 8, 2007.*
Search Report for European Pat. App. No. 09177302.8 dated Jul. 2, 2010.
Lhuillier et al., "A simple distance-based update scheme to track mobile user proximities", IP.Com Journal, Dec. 15, 2004, IP.Com, Inc., West Henrietta, NY.
Leonhardi et al., "A Comparison of Protocols for Updating Location Information", Cluster Computing, Jan. 1, 2001, pp. 355-367, vol. 4, Kluwer Academic Publishers.
Amir et al., "Buddy tracking—efficient proximity detection among mobile friends", Infocom 2004. Twenty-Third Annual Joint Conference of the IEEE Computer and Communications Societies, Mar. 7, 2004, pp. 298-309, vol. 1, IEEE, Piscataway, NJ.
Thru et al., "Extending the LBS-framework TraX: Efficient proximity detection with dead reckoning", Computer Communications, pp. 1040-1051, vol. 31, No. 5, Elsevier Science Publishers BV, Amsterdam, the Netherlands, Dec. 2007.

* cited by examiner

*Primary Examiner* — Patrice Winder
(74) *Attorney, Agent, or Firm* — McDonnell Boehnen Hulbert & Berghoff LLP

(57) ABSTRACT

A service is provided to users of communication devices present in a geographic service area. Each device is associated with a specific user. The service comprises conditionally alerting a user, via his/her communication device, to a presence of another device of another user. The alerting occurs if the other user is registered as a buddy of the user and if a geographical distance between the user's device and the buddy's device is smaller than a pre-determined threshold. A succession of polling cycles is run. In each polling cycle, the mobile devices are sequentially polled based on location and according to a ranking determined in a preceding polling cycle that minimizes a value of a sum of terms. Each respective term indicates a respective difference between rankings of the mobile device of the respective user and of the mobile device of the buddy of the respective user.

5 Claims, 3 Drawing Sheets

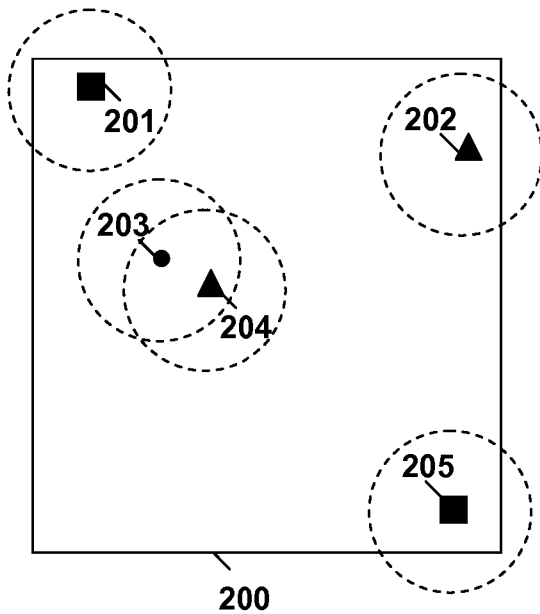
Fig.2
$$P_{c=1} = \begin{pmatrix} 201 \\ 202 \\ 203 \\ 204 \\ 205 \end{pmatrix}$$
$$P_{c=2} = \begin{pmatrix} 201 \\ 205 \\ 203 \\ 204 \\ 202 \end{pmatrix}$$
Fig.3
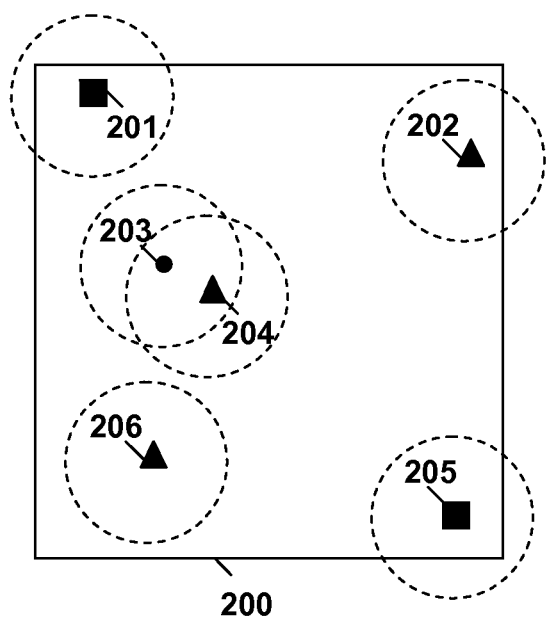
Fig.4
$$P_{c=17} = \begin{pmatrix} 201 \\ 205 \\ 203 \\ 204 \\ 202 \\ 206 \end{pmatrix}$$
$$P_{c=18} = \begin{pmatrix} 201 \\ 205 \\ 206 \\ 204 \\ 202 \\ 203 \end{pmatrix}$$
Fig.5

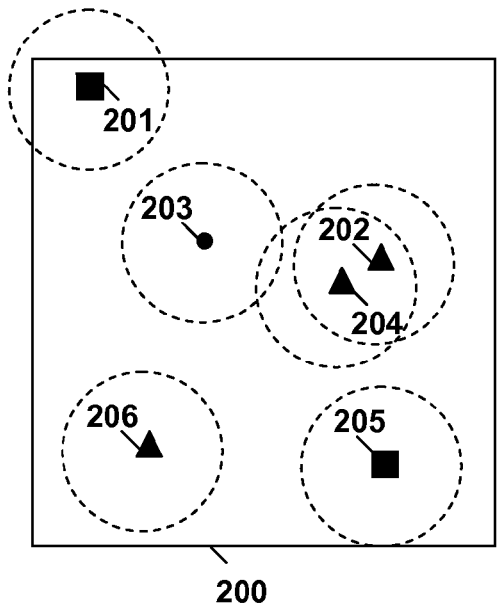
Fig.6
$$P_{c=19} = \begin{bmatrix} 201 \\ 205 \\ 206 \\ 204 \\ 202 \\ 203 \end{bmatrix}$$
Fig.7
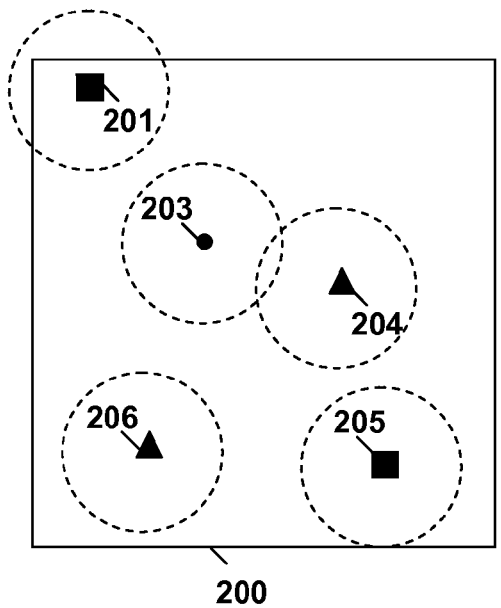
Fig.8
$$P_{c=20} = \begin{bmatrix} 201 \\ 205 \\ 206 \\ 204 \\ 203 \end{bmatrix}$$
Fig.9

OPTIMIZING BUDDY FINDER TELECOMMUNICATION SERVICE

FIELD OF THE INVENTION

Herein is described a method of providing a service to a plurality of users of communication devices present in a geographic service area covered by the service, control software for use according to the method, and to a data processing system configured for providing the service.

BACKGROUND ART

The expression "buddy finder" is used within a telecommunications context and refers to a specific social networking service. The service is provided to registered users of electronic communications equipment, such as mobile telephones and network-enabled palmtop computers, etc. The service alerts a first user to the fact that a second user, who is listed with the service as a buddy of the first user, is currently located within a pre-determined distance from the geographic location of the first user. The service determines the geographic locations of a mobile communication device based on, e.g., identifying in which cell the communication device is currently located based on the location of the base station of the mobile telephone network that receives the strongest signal from the mobile device, or on triangulation of the signals from the device received at multiple base stations.

When a person "A" has registered with the buddy finder service, data representative of the geographical location of the mobile telephone of person "A" is uploaded to a server. At the server, the data can be used to alert another person "B", e.g., registered with the service as allowed by person "A" to be alerted, to the current geographic location of person "A". The alerting then uses, e.g., the mobile phone or other mobile, network enabled computing device of person "B". The relevant geographic location can be indicated as a certain mark in a geographic map rendered at the mobile telephone of person "B". The alerting may be made conditional depending on the magnitude of the distance between the geographic locations determined for persons "A" and "B".

For some general background on buddy finder services and technologies, please see, e.g., US patent application publication 20020183052; Japanese patent application publication JP 2003-153522; and European patent application publication 1 691 565.

SUMMARY

Consider the conditional alerting based on the distance between the geographic locations of two buddies, as discussed above. Buddy locations, calculated by the server in the known systems, may be unacceptably inaccurate. One reason for this is that any server has only limited performance and users may be on the move. That is, by the time the server has calculated the current location of the last person on a list of mobile users, the locations determined for the other users are incorrect if they have moved on to other locations. For example, assume that one second is a typical length of time needed by the server for processing the relevant geographic location data and determining the location for a particular person. Then, it takes one quarter of an hour to determine the locations for 900 people. Now consider the scenario that the locations of two buddies, referred to as "buddy "A" and "buddy "B", have been determined 10 minutes apart. That is, the location of buddy A is determined at a time T, and the location of buddy B is determined at a time T+10 minutes. The location of buddy A may have been determined, while buddy A is on the move or just before buddy A is going to change his/her geographical position. As a result, by the time the location of buddy B has been determined, i.e., ten minutes later, there may be a gross discrepancy between, on the one hand, the geographical distance between buddy A and buddy B, as calculated on the basis of their geographical locations determined 10 minutes apart, and, on the other hand, their actual distance. It would therefore be advantageous if the duration of the time period were reduced between the moments at which the locations of buddies were determined.

Herein is described a method for providing a service to a plurality of users of communication devices that are active and present in a geographic service area covered by the service. Each specific one of the communication devices is associated with a specific one of the plurality of users. The service comprises conditionally alerting a particular one of the plurality of users, via a particular one of the communication devices associated with the particular user, to a presence of another one of the communication devices of another one of the plurality of users in the service area. The alerting takes place under a determination of at least a first condition, that the other user is registered as a buddy of the particular user, under a second condition, that at least one of the particular communication device and the other communication device is a mobile communication device, and under a third condition, that a geographical distance between the particular communication device and the other communication device is smaller than a predetermined threshold. A succession of polling cycles are run. In each specific one of the polling cycles, mobile ones among the communication devices are sequentially polled with regard to geographic location and according to a specific ranking determined in a preceding one of the polling cycles. The specific ranking is determined so as to minimize a value of a sum of terms. Each respective one of the terms is indicative of a respective difference between a possible rank of the respective mobile communication device of the respective user and a respective possible other rank of the respective other mobile communication device of the respective other user registered as a buddy of the respective user.

The difference in possible ranks is indicative of a length of a time interval between, on the one hand, polling a mobile communication device of a user and, on the other hand, polling another mobile communication device of another user registered as a buddy of the user. Minimizing the sum of terms corresponds to minimizing the aggregate of the times elapsed between polling the users and their buddies.

The term "minimize" as used herein is intended to also cover approaches or algorithms that attempt to make the value of the sum as small as possible given the practical circumstances such as a limit to the time available for determining the solution to the minimizing problem. The problem of minimizing the value of the sum of terms may be a mathematical NP-complete problem, i.e., a problem for which the time, needed to solve it, grows exponentially with the size of the problem, here: the number of terms involved. One can tackle the problem for practical purposes by, e.g., approximation (i.e., searching for an approximation of the optimum solution instead of for the optimum solution); randomization (e.g., try a number of different specific rankings and retain the one which gives the lowest value of the sum of terms); parameterization (e.g., keep the ranks of certain mobile phones fixed and optimize with respect to the remaining ones); etc. The term "minimize" is therefore to be understood as also including determining a ranking for the next polling cycle that gives a next value of the sum of terms that is smaller than the value obtained in the preceding polling cycle.

In an embodiment of the method, the respective term is representative of a respective absolute value, e.g., the square, of a respective difference between a respective rank of the respective mobile communication device and a respective further rank of the respective further mobile communication device.

The magnitude of the predetermined threshold may be uniformly applicable to all users. Alternatively, for each individual one of the users an individual magnitude of the predetermined threshold may have been specified. That is, different users may receive alerts when their buddies are within different ranges.

Note that a first user may have registered as a buddy of a second user, but that the second user may not have registered as a buddy of the first user. Also note that the alerting of a user to the presence of a buddy only makes sense if at least one of the communication device of the user and the communication device of the buddy is a mobile communication device. The geographic location of a stationary communication device, e.g., a landline telephone, needs only be determined once, e.g., by means of determining the associated street address and converting the street address into geographic map coordinates. The map coordinates can be stored in a look-up table.

The next ranking may conflict with the preceding ranking that was applied in the preceding polling cycle. More specifically, the rank assigned to a specific user in the next ranking as a result of minimizing the sum of terms, may coincide with the rank of another user in the preceding ranking, who was not represented in the sum of terms. For example, the other user may not have had a buddy present within the service area, or may have had a buddy present whose communication device was turned off. The herein-described method attempts to minimize the time interval between polling a user and polling this user's buddy, for all pairs of user and associated buddy combined. Accordingly, one may change the rank of the other user, who was not represented in the sum of terms, in order to avoid two users from being assigned to the same rank. This change of ranks does not affect the quality of service either with regard to this other user or with regard to the user, who was represented in the sum of terms to be minimized. The ranks of the users, not represented in the sum of terms, can be changed according to any suitable algorithm in order to avoid duplicate assignments to the same rank. For example, if a new rank is determined for a specific user by minimizing the sum of terms and if this new rank coincides with the rank in the preceding ranking occupied by another user not represented in the sum of terms, the specific user and the other user may simply swap ranks in the next ranking.

In an embodiment of the method, for each respective term in the sum of terms, a respective geographical distance between the respective mobile communication device of the respective user and the respective other mobile communication device of the respective other user registered as a buddy of the respective user is smaller than a further pre-determined threshold larger than the pre-determined threshold first-mentioned.

In this embodiment, the ranks of only particular ones of the mobile communication devices present in the service area are considered for optimizing the value of the sum of terms. A pair of mobile communication devices, one of a user and another one of the user's buddy, is considered in the sum of terms, only if they are already within a certain distance from each other, larger than the threshold for issuing the alert. The alert is raised if the user and his/her buddy are within a first range. It is therefore convenient to select only those users for optimizing their ranking, and therefore minimizing the difference between their polling times, if there is a reasonable chance that they will come within the first range of each other.

Above embodiments give examples of the herein-described method. Such a method is commercially relevant to, e.g., a service provider or a network operator.

Another embodiment described herein is control software, stored on a computer-readable medium. The control software is configured for use in a method of providing a service to a plurality of users of communication devices present in a geographic service area covered by the service. Each specific one of the communication devices is associated with a specific one of the plurality of users. The service comprises conditionally alerting a particular one of the plurality of users, via a communication device associated with the particular user, to a presence of another communication device of another one of the plurality of users in the service area. The alerting takes place under following conditions: the other user is registered as a buddy of the particular user; at least one of the particular communication device and the other communication device is a mobile communication device; and a geographical distance between the particular communication device and the other communication device is determined as being smaller than a predetermined threshold. The method comprises running a succession of polling cycles. In each specific one of the polling cycles, mobile ones among the communication devices are sequentially polled with regard to geographic location and according to a specific ranking determined in a preceding one of the polling cycles. The control software comprises instructions for choosing the specific ranking so as to minimize a value of a sum of terms, wherein each respective one of the terms is indicative of a respective difference between a possible rank of the respective mobile communication device of the respective user and a respective possible other rank of the respective other mobile communication device of the respective other user registered as a buddy of the respective user.

The computer-readable medium comprises, e.g., a memory implemented on a magnetic disk (e.g., a hard-disk) or on an optical disk (e.g., a CD-ROM), or a semiconductor memory (e.g., a memory stick or implemented as an integrated circuit chip). The control software is commercially relevant to, e.g., a software provider or a set-maker. The control software may be in the form of source code, or of object code, or in the form of an intermediate code, being between source code and object code, such as code in a partially compiled format. Further embodiments of the control software may have additional instructions, for example, instructions that control the execution of one or more steps occurring in various embodiments of the herein-described method, discussed in this description and/or specified in the appended dependent method claims.

Yet another embodiment described herein is a data processing system, configured for providing a service to a plurality of users of communication devices present in a geographic service area covered by the service. Each specific one of the communication devices is associated with a specific one of the plurality of users. The service comprises conditionally alerting a particular one of the plurality of users, via a communication device associated with the particular user, to a presence of another communication device of another one of the plurality of users in the service area. The alerting takes place under following conditions: the other user is registered as a buddy of the particular user; at least one of the particular communication device and the other communication device is a mobile communication device; and a geographical distance between the particular communication device and the other communication device is determined as being smaller than a predetermined threshold. The data processing system is configured for running a succession of polling cycles. In each specific one of the polling cycles, mobile ones among the communication devices are sequentially polled with regard to geographic location and according to a specific ranking determined in a preceding one of the polling cycles. The data processing system is operative to determine the specific ranking so as to minimize a value of a sum of terms, wherein each respective one of the terms is indicative of a respective difference between a possible rank of the respective mobile communication device of the respective user and a respective possible other rank of the respective other mobile communication device of the respective other user registered as a buddy of the respective user.

Further embodiments of the data processing system may have additional features, for example, features that are operative to carry out one or more steps of the herein-described method and/or specified in the appended dependent method claims.

BRIEF DESCRIPTION OF THE DRAWINGS

The disclosure is explained in further detail, by way of example and with reference to the accompanying drawing, wherein:

FIGS. 2-9 are diagrams for illustrating a context of usage of a method using a simple example.

Throughout the Figures, similar or corresponding features are indicated by same reference numerals.

DETAILED EMBODIMENTS

Figure 1:
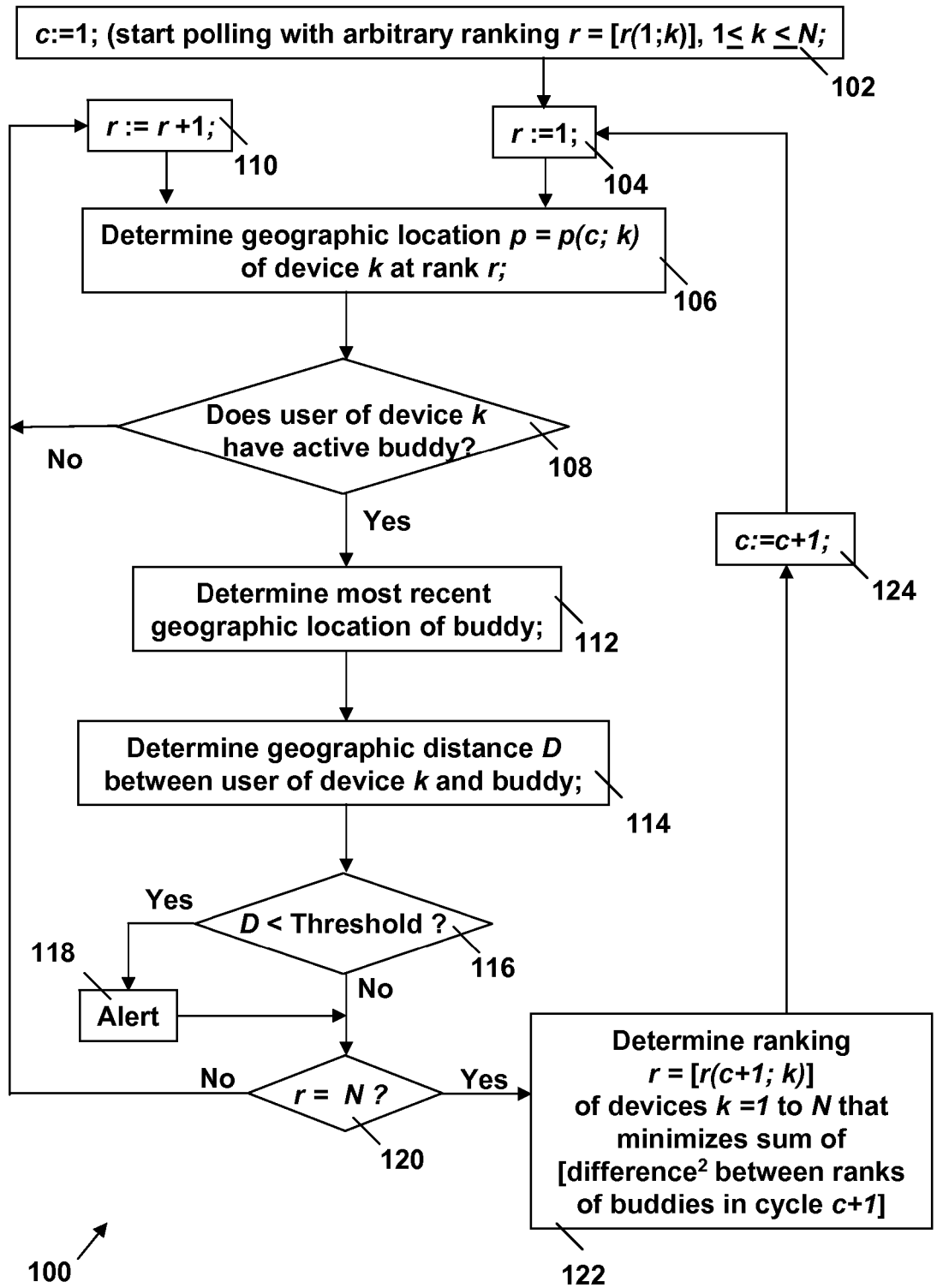
FIG. 1 is a flow diagram illustrating an example embodiment of a method.

Consider a set of a plurality of N users of communication devices, the quantity "N" being a positive integer. Each of the N users carries a respective communication device. The geographic location of a particular communication device is assumed to correspond with the geographic location of the user of that particular communication device. The identity of the user and the identity of his/her communication device are being used interchangeably in this text. A geographic location "p" of a specific communication device with index "i" in a polling cycle with index "c" is indicated by a 2-dimensional vector "p(i; c)" that is indicative of, e.g., the latitude and the longitude of the geographic location "p".

It is important to keep in mind that the N users are being polled sequentially, i.e., one after the other, and that the polling sequence will generally vary from one cycle to the next as will be explained below.

The specific state of the N users at the end of the particular polling cycle c is represented by an ordered set of geographic locations $\{p(k; c); p(l; c); p(m; c); \ldots; p(q; c))\}$. Herein, $p(k; c)$ is the geographic location of the user with index k, who was polled first in the cycle c; $p(l; c)$ is the geographic location of the user with index l who is the second one that was polled in the cycle c; wherein $p(m; c)$ is the geographic location of the user with index m who is the third one who was polled in the cycle c; and ..., wherein $p(q; c)$ is the geographic location of the user with index q who is the last one who was polled in the cycle c.

Now, form the N-dimensional vector "$P(c)$" of which the component at rank "x" corresponds with the identity of the user i, who was the $x^{th}$ one polled in the polling cycle c. That is, the N-dimensional vector "$P(c)$" of above example has components $(k; l; m; \ldots; q)$. Now consider a next polling cycle "$c+1$", wherein the polling sequence is changed with respect to the one of the current polling cycle "c". Mathematically, this change can be represented by subjecting the N-dimensional vector $P(c)$ to a matrix transformation $P(c+1)=T \cdot P(c)$, wherein the matrix T is a unitary matrix. The matrix T effects a new polling sequence in the next cycle $c+1$ by means of implementing a permutation of the polling sequence assumed in the previous cycle c. The rows of the matrix T are formed by the mutually orthogonal unit vectors that together span the N-dimensional vector space for vector $P(c)$.

The number of possible permutations of an ordered set of N elements equals the factorial of the number N, i.e., $N!=N \cdot (N-1) \cdot (N-2) \ldots \cdot 2 \cdot 1$, wherein the symbol "·" indicates the ordinary scalar multiplication. The permutation sought is one that reduces or minimizes the differences in polling times of those pairs among the N users, who have been registered as buddies of each other. Note that the polling time at which the user i is being polled during the cycle c corresponds to the rank of the user i in the N-dimensional vector $P(c)$. The difference between the polling time of a user i and the polling time of a user j during the cycle c corresponds therefore to the difference in ranks of the user i and of the user j in the vector $P(c)$. Accordingly, a permutation that minimizes the sum of the differences in polling times of all those pairs of users, who are registered as buddies, minimizes the sum of the differences in ranks of the buddies in the N-dimensional vector P. As the difference in ranks of a pair of buddies can be negative, it is preferred to minimize the sum of the squares of the differences in the ranks or the sum of the absolute values of the differences. When minimizing the sum, preferably only those buddies are considered who are within a certain geographic distance from one another, as determined in the previous polling cycle.

Accordingly, an embodiment of the method is implemented as follows. Sequentially poll the respective geographic locations of respective ones of the users within the geographic area covered by the service. Determine whether there are pairs of buddies among the users polled. Note that a specific user may have more than one buddy. For each respective pair of buddies identified, determine a respective geographic distance between the respective pair of buddies. If the respective geographic distance between the respective pair is smaller than a pre-determined threshold, label the respective pair as active. Once all active pairs have thus been identified, minimize the sum, over all active pairs, of the squares of the differences in rank between the active pairs. The solution to this optimization problem gives a set of new polling ranks for the buddies of the active pairs. The new polling ranks are to be used in the next cycle $c+1$. The remaining users, not being considered in the optimization problem in the cycle c, are then polled at the ranks not occupied by the active pairs of buddies. Any suitable allocation policy can be used to determine the polling rank of any specific one of the remaining users. For example, if a specific buddy of a specific active pair receives a new rank for the cycle $c+1$, which was occupied by a particular remaining user in the cycle c, the specific buddy and the remaining user swap ranks for the cycle $c+1$.

FIG. 1 is a flow diagram 100 illustrating a process in an example embodiment of the method. Assume that a number of active mobile communications devices present in the service area equals an integer N. As an initialization step, the N mobile communication devices are ranked in an arbitrary order. Each respective one of the N active mobile communication devices is assigned a respective index k, the index k being an integer running from $k=1$ to $k=N$. A specific one of the N active mobile communication devices, say active mobile communication device with index k, will assume a rank $r=r(c; k)$ in the polling cycle with index c.

In a first step 102, preparations are made to initiate, in a first polling cycle c=1, the polling of the active mobile communication devices present within the service area. The polling in the first polling cycle c=1 may start with an arbitrary ranking array r=r(1; k), the index k running from 1 to N.

In a second step 104, the mobile communication device occurring at rank r=1 is selected. Assume that this is the mobile communication device with index k.

In a third step 106, the geographic location p=p (1; k) is determined of the mobile communication device with index k. The geographic location p=p (1; k) is temporarily stored in a database.

In a fourth step 108, it is determined if the user of the mobile communication device with index k has an active buddy present within the service area. If not, then the process proceeds with a fifth step 110, wherein the mobile communication device occurring at the next rank r:=r+1 is selected. From the fifth step 110, the process then returns to the third step 106, wherein the geographic location is determined of the mobile communication device occurring at the rank r:=r+1. If it is determined in the fourth step 108 that there are one of more active buddies present within the service area, the process proceeds with a sixth step 112, wherein the most recent geographic location, determined for the buddy, is retrieved from the database. If there are multiple buddies present, the most recent geographic locations determined for the buddies are retrieved from the database. Note that, if there is an active buddy physically present within the service area, this buddy may not have been polled yet and may therefore still be invisible to the process of flow diagram 100 until being polled later on in the same polling cycle. Accordingly, an unpolled buddy of the user of the mobile communication device, which is currently being polled, causes the process to go from the fourth step 108 to the fifth step 110.

If the most recent geographic locations of the one or more buddies have been determined in the sixth step 112, the process proceeds with a seventh step 114.

In the seventh step 114, the geographic distance is determined between, on the one hand, the geographic location of the communication device currently being polled, and the most recent geographic location of each buddy on the other hand.

In a next, eighth, step 116 it is determined for each buddy involved in the sixth step 112, whether or not the buddy is within a threshold or pre-determined distance from the user of the mobile communication device currently being polled.

If there is a buddy present within the pre-determined distance, the process proceeds to a ninth step 118, wherein the user of the mobile communication device, currently polled, is being alerted to the buddy's presence via his/her mobile communication device. The user may then give a call to his/her buddy to see whether it is convenient to team up, go for a good glass of beer together, do some ad-hoc inventing just for the fun of it, etc.

The pre-determined distance may be selected as uniformly applicable to all users of mobile communication devices present within the service area. Alternatively, each individual one of these users may have specified in advance that they only need to be alerted to the presence of their buddies if the buddies are within an individually specified distance. The individual user may even have specified different distances for different buddies as criterions for being alerted to their presence.

As an option, the mobile communication device of the user who has been just alerted is taken out of the ranking for the next one or more cycle in order to avoid receiving multiple alerts with respect to the presence of the same buddy. As an alternative option, the specific buddy, to whose presence the user has been alerted in the ninth step 118, is omitted from the evaluation in the eighth step 108 during the next one or more polling cycles.

If it has been determined in the eighth step 116 that there are no buddies within the pre-determined distance, the process proceeds to the tenth step 120. Also, after having alerted the user in the ninth step 118, the process proceeds with the tenth step 120.

In the tenth step 120, it is determined if the mobile communication device has been polled that occupies the rank r=N in the current ranking. If not, the process returns to the fifth step 110 to set the stage for the polling of the mobile communication device at the next rank in the ranking used in the current polling cycle.

If it is determined in the tenth step 120 that all mobile communication devices, represented in the current ranking, have been polled, the process proceeds with an eleventh step 122.

In the eleventh step 122, the ranking array r=[r(c+1; k)] for the next polling cycle c+1 is determined. As discussed above in detail, the ranking array r=[r(c+1; k)] for the next polling cycle c+1 is selected as that ranking, which minimizes the sum of terms, wherein each respective one of the terms is representative of an absolute value of the difference between ranks of a respective user and his/her respective buddy. Several algorithms can be used to find an approximation of the optimum solution if it is not possible to find the optimum solution within the time available. See the explanation of the term "minimize" as discussed above. Once the ranking array r=[r(c+1; k)] has been determined in the eleventh step 122, the process proceeds to a twelfth step 124 to increment the value of c by unity, the incremented value being the index of the next polling cycle. The process then returns to the second step 104, wherein the mobile communication device now occurring at the rank r=1 in the new ranking array [r(c+1; k)].

Consider now a scenario, wherein a specific user has two or more buddies, and that each of the buddies is within the pre-determined distance from the specific user. It is highly likely that one of the buddies in closer to the specific user than another one of the buddies. It would therefore be desirable that the difference between the polling ranks of the specific user and the closer one of the buddies were smaller than the difference between the polling ranks of the specific user and a more distant buddy. The ranking array r=[r(c+1; k)] for the next polling cycle c+1 as determined above does not take into account the differences in distance between the specific user and each of this user's buddies represented in the ranking array. Accordingly, one could therefore extend the process, illustrated in FIG. 1, as follows. Assume that the ranking array r=[r(c+1; k)] has been determined through minimizing the sum, as specified in the eleventh step 122 discussed above. Now identify in this ranking array r=[r(c+1; k)] each user, who has two or more buddies represented in the ranking array r=[r(c+1; k)]. It may well be that permuting the ranks of these buddies does not affect, or does not substantially affect, the outcome of minimizing the sum. Whether or not the permutation of the ranks of this specific user's buddies affects the outcome, depends on whether the buddies of this specific user have also been registered as buddies of other users represented in the sum. For example, one may limit the permutation to only those buddies who are represented at successive ranks. As another example, one may swap the ranks of two buddies of the specific user so as to have a shorter time interval between the specific user and the geographically closest one of the buddy of the specific user, than another time interval between polling the specific user and any of the other buddies.

FIG. 2 is a diagram for illustrating a context of the method with reference to a set of N=5 users: a first user 201, a second user 202, a third user 203, a fourth user 204 and a fifth user 205 being present within a geographical service area 200. Assume that the communication devices of the first user 201, of the second user 202, of the third user 203, of the fourth user 204 and of the fifth user 205 are all mobile communication devices, e.g., mobile telephones. Assume further, that the fifth user 205 has registered as a buddy of the first user 201, and that the second user 202 and the fourth user 204 have registered as buddies of each other. Assume also that a current polling cycle has polled the mobile users 201-205 in the following order: the first user 201, the second user 202, the third user 203, the fourth user 204 and the fifth user 205. The dashed circles in the diagram of FIG. 2, each specific one being centered around a specific one of the users 201-205, indicates the range, within which a pair of users, of which at least one has been registered as a buddy of the other, are to be present in order for at least one of them to be alerted to the other's presence. The range is chosen to be uniform for all users 201-205 in this example. Alternatively, each respective one of users 201-205 may have specified a respective one of different ranges.

As is clear, the first user 201 and the fifth user 205 are not within each other's range, and the second user 202 and the fourth user 204 are not within each other's range. The third user 203 and the fourth user 204 are within each other's range, but neither has been registered as a buddy to the other. Accordingly, no one of the users 201-205 needs to be alerted.

It would be convenient to poll in the next cycle the second user 202 and the fourth user 204 in successive polling operations as they are registered as buddies to one another. It would also be convenient to poll the first user 201 and the fifth user 205 in successive polling operations.

Accordingly, in the next cycle, the following polling sequence is assumed. The first user 201 remains at his/her rank and is polled at the first rank. The fifth user 205 changes his/her rank and is polled at the second rank. The second user 202 is moved to the fifth rank, just vacated by the fifth user 205, whereas the third user 203 and the fourth user 204 stay at the third and fourth ranks, respectively. By reshuffling the ranks, the difference in time is minimized between polling in the same cycle a specific user and a specific other user, between whom a buddy relationship has been registered.

FIG. 3 gives the 5-dimensional vector "P(c=1)", of which the component at rank "m" corresponds with the identity of the user i, who was the $m^{th}$ one polled in the polling cycle c=1. FIG. 3 also gives the 5-dimensional vector "P(c=2)", of which the component at rank "m" corresponds with the identity of the user i, who was the $m^{th}$ one polled in the polling cycle c=2.

Note that the buddy relationship between a pair of users can be unidirectional, such as between the first user 201 and the fifth user 205. In the unidirectional relationship, only one of the users is registered as a buddy of the other user. In a bidirectional relationship, each of the pair of users is registered as a buddy to the other one of the pair of users, such as for the second user 202 and the fourth user 204.

The polling sequence thus determined can be maintained so long as no other user appears in the service area 200, who has a buddy relationship with one or more of the users 201-205 already present, or so long as none of the users 201-205 already present within the service area 200 physically leaves the service area or functionally leaves the service area by means of deactivating his/her communication device.

FIG. 4 is a diagram for illustrating a context of the method with reference to a set of N=6 users that has evolved from the context in the diagram of FIG. 2 after a new user has joined. A new, sixth user 206 has entered the service area 200, thus joining the first user 201, the second user 202, the third user 203, the fourth user 204 and the fifth user 205 already present within a geographical service area 200. The sixth user 206 is registered as a buddy to the fifth user 205 and also as a buddy to the fourth user 204. Before the sixth user 206 entered the service area 200, the polling sequence, i.e., the ranking in the polling cycle had been in order of polling: the first user 201, the fifth user 205, the third user 203, the fourth user 204 and the second user 202, as indicated by the 5-dimensional vector P(c=2) in FIG. 3. After the appearance of the sixth user 206 in say, cycle c=17, the polling sequence is as follows: the first user 201, the fifth user 205, the third user 203, the fourth user 204, the second user 202, and the sixth user 206, as indicated by the 6-dimensional vector P(c=17) of FIG. 5. The polling sequence can be optimized for the next cycle c=18 by minimizing the sum of the differences in ranking between pairs of buddies. Accordingly, the polling sequence in the next cycle c=18 is: the first user 201, the fifth user 205, the sixth user 206, the fourth user 204, the second user 202, and the third user 203. This is indicated in FIG. 5 by the 6-dimensional vector P(c=18).

FIG. 6 is a diagram for illustrating a context of the method with reference to a set of N=4 users that has evolved from the context in the diagram of FIG. 4. In the diagram of FIG. 6, the second user 202 and the fourth user 204 have moved to within range of each other, so that an alert can be issued. This is established in cycle c=19. The second user 202 is being polled immediately after the fourth user 204 has been polled in the applicable polling sequence. Accordingly, the most accurate information, about the geographic distance between the second user 202 and the fourth user 204, is available just after the last one of the pair of buddies has been polled, i.e., just after the second user 202 has been polled. The second user 202 or the fourth user 204 will be notified of the opportunity to contact their buddy. Alerting both the second user and the fourth user 204 simultaneously may also be an option, albeit that there is a chance that both of them will receive a "busy" signal when trying to call the other.

After having issued an alert, or both alerts, the second user 202 may be removed from the polling sequence, as there are no more buddies of the second user 202 available within the service area 202. The removal may be temporary, e.g., at least for the duration of some time interval after the issue of the alerts. The removal may also be conditional, e.g., upon the second user 202 sending an explicit request for removal to the service provider, e.g., via SMS, and if there are no more buddies of the second user 202 present in the service area 200. A software application at the mobile communication device of the second user 202 may implement this procedure upon a dedicated user-input via the user interface of the communication device of the second user 202, or upon having identified a caller-ID of the fourth user 204, when a communication is being set up between the communication device of the second user 202 and the communication device of the fourth user 204. Note that the fourth user 204 need not be removed from the polling sequence as there is another buddy of the fourth user present, namely the sixth user 206.

FIG. 8 is a diagram of the context of the method after removal of the second user 202 from the polling list for the next cycle c=20. The resulting polling sequence in the cycle c=20 is indicated by the 5-dimensional vector P(c=20) in FIG. 9.

The invention claimed is:

1. A method of providing a service to a plurality of users of communication devices present in a geographic service area covered by the service, the method comprising:
associating each specific one of the communication devices with a specific one of the plurality of users;
conditionally alerting a particular one of the plurality of users, via a communication device associated with the particular user, to a presence of another communication device of another one of the plurality of users in the service area, wherein the conditional alerting takes place upon a determination comprising:
that the other user is registered as a buddy of the particular user,
that at least one of the particular communication device and the other communication device is a mobile communication device, and
that a geographical distance between the particular communication device and the other communication device is less than a first predetermined threshold; and
running a succession of polling cycles, wherein in each specific one of the polling cycles, mobile ones among the communication devices are sequentially polled with regard to geographic location and according to a specific ranking determined in a preceding one of the polling cycles,
wherein the specific ranking is determined to minimize a value of a sum of terms, and
wherein each respective one of the terms is indicative of a respective difference between a possible rank of the respective mobile communication device of the respective user and a respective possible other rank of the respective other mobile communication device of the respective other user registered as the buddy of the respective user.

2. The method of claim 1, wherein the first predetermined threshold differs for at least two users in the plurality of users.

3. The method of claim 1, wherein, for each respective term in the sum of terms, a respective geographical distance between the respective mobile communication device of the respective user and the respective other mobile communication device of the respective other user registered as a buddy of the respective user is smaller than a second predetermined threshold that exceeds the first predetermined threshold.

4. A non-transitory computer-readable storage medium comprising control software that, when executed on a data processing system, is configured for providing a service to a plurality of users of communication devices present in a geographic service area covered by the service, the control software comprising:
instructions for associating each specific one of the communication devices with a specific one of the plurality of users;
instructions for conditionally alerting a particular one of the plurality of users, via a communication device associated with the particular user, to a presence of another communication device of another one of the plurality of users in the service area, wherein the conditional alerting takes place upon a determination comprising:
that the other user is registered as a buddy of the particular user,
that at least one of the particular communication device and the other communication device is a mobile communication device, and
that a geographical distance between the particular communication device and the other communication device is less than a first predetermined threshold; and
instructions for running a succession of polling cycles, wherein in each specific one of the polling cycles, mobile ones among the communication devices are sequentially polled with regard to geographic location and according to a specific ranking determined in a preceding one of the polling cycles,
wherein the specific ranking is determined to minimize a value of a sum of terms, and
wherein each respective one of the terms is indicative of a respective difference between a possible rank of the respective mobile communication device of the respective user and a respective possible other rank of the respective other mobile communication device of the respective other user registered as a buddy of the respective user.

5. A data processing system, configured for providing a service to a plurality of users of communication devices present in a geographic service area covered by the service, wherein the data processing system is configured for at least:
associating each specific one of the communication devices is associated with a specific one of the plurality of users;
conditionally alerting a particular one of the plurality of users, via a communication device associated with the particular user, to a presence of another communication device of another one of the plurality of users in the service area wherein the conditional alerting takes place upon a determination comprising:
that the other user is registered as a buddy of the particular user,
that at least one of the particular communication device and the other communication device is a mobile communication device, and
that a geographical distance between the particular communication device and the other communication device is less than a first predetermined threshold; and
running a succession of polling cycles, wherein in each specific one of the polling cycles, mobile ones among the communication devices are sequentially polled with regard to geographic location and according to a specific ranking determined in a preceding one of the polling cycles,
wherein the specific ranking is determined to minimize a value of a sum of terms, and
wherein each respective one of the terms is indicative of a respective difference between a possible rank of the respective mobile communication device of the respective user and a respective possible other rank of the respective other mobile communication device of the respective other user registered as a buddy of the respective user.

* * * * *